US012579220B2

(12) United States Patent (10) Patent No.: US 12,579,220 B2
Sharma et al. (45) Date of Patent: Mar. 17, 2026

(54) VISUAL ATTRIBUTE EXPANSION VIA MULTIPLE MACHINE LEARNING MODELS

(71) Applicant: Microsoft Technology Licensing, LLC, Redmond, WA (US)

(72) Inventors: Pramod Kumar Sharma, Seattle, WA (US); Yijian Xiang, Redmond, WA (US); Yiran Li, Bunaby (CA); Paul Pangilinan Del Villar, Bothell, WA (US); Liang Du, Redmond, WA (US); Robin Abraham, Redmond, WA (US); Nilgoon Zarei, Kirkland, WA (US); Mandar Dilip Dixit, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 734 days.

(21) Appl. No.: 17/480,869

(22) Filed: Sep. 21, 2021

(65) Prior Publication Data

US 2023/0088925 A1 Mar. 23, 2023

(51) Int. Cl.
| | |
|---|---|
| *G06F 18/2431* | (2023.01) |
| *G06F 18/213* | (2023.01) |
| *G06N 3/044* | (2023.01) |
| *G06T 7/11* | (2017.01) |

(52) U.S. Cl.
CPC ........ *G06F 18/2431* (2023.01); *G06F 18/213* (2023.01); *G06N 3/044* (2023.01); *G06T 7/11* (2017.01); *G06T 2207/20084* (2013.01)

(58) Field of Classification Search
CPC ... G06F 18/2431; G06F 18/213; G06N 3/044; G06T 7/11; G06T 2207/20084; G06V 10/46; G06V 10/56; G06V 10/82; G06V 20/60; G06V 10/26
See application file for complete search history.

(56) References Cited

U.S. PATENT DOCUMENTS

| | | | | |
|---|---|---|---|---|
| 10,489,683 B1 * | 11/2019 | Koh | ....................... | G06N 20/20 |
| 10,747,807 B1 * | 8/2020 | Garg | .................... | G06F 3/0482 |
| 11,087,742 B1 * | 8/2021 | Levy | ..................... | G10L 15/063 |
| 11,282,221 B1 * | 3/2022 | Yang | ..................... | G16H 50/20 |
| 11,551,096 B1 * | 1/2023 | Mishra | .................. | G06N 3/092 |
| 11,887,217 B2 * | 1/2024 | Maheshwari | .......... | G06V 10/40 |

(Continued)

FOREIGN PATENT DOCUMENTS

| | | |
|---|---|---|
| CN | 110060239 A | 7/2019 |
| CN | 112949655 A | 6/2021 |

(Continued)

OTHER PUBLICATIONS

Lin et al. "PAM: Understanding Product Images in Cross Product Category Attribute Extraction" ADS Track Paper, KDD 2021, Aug. 14-18, 2021, pp. 3262-3270 (Year: 2021).*

(Continued)

*Primary Examiner* — Mia M Thomas
(74) *Attorney, Agent, or Firm* — Schwegman Lundberg & Woessner, P.A.

(57) ABSTRACT
A computer implemented method includes receiving an image that includes a type of object, segmenting the object into multiple segments via a trained segmentation machine learning model, and inputting the segments into multiple different attribute extraction models to extract different types of attributes from each of the multiple segments.

20 Claims, 22 Drawing Sheets

(56) References Cited

U.S. PATENT DOCUMENTS

| | | | | |
|---|---|---|---|---|
| 2003/0108237 A1* | 6/2003 | Hirata | | G06T 7/11 |
| | | | | 382/164 |
| 2016/0019587 A1* | 1/2016 | Hueter | | G06Q 10/04 |
| | | | | 705/14.53 |
| 2017/0301085 A1* | 10/2017 | Riklin Raviv | | G16H 40/63 |
| 2018/0150444 A1* | 5/2018 | Kasina | | G06F 40/186 |
| 2018/0204088 A1* | 7/2018 | Chen | | G06V 10/776 |
| 2019/0035431 A1* | 1/2019 | Attorre | | G10L 25/30 |
| 2019/0388005 A1* | 12/2019 | Averbuch | | A61B 5/06 |
| 2020/0082222 A1* | 3/2020 | Cohen | | G06V 10/764 |
| 2020/0145623 A1* | 5/2020 | Sadanand | | G06V 20/46 |
| 2020/0193591 A1* | 6/2020 | Kamiyama | | G06T 7/60 |
| 2020/0211692 A1* | 7/2020 | Kalafut | | G16H 30/20 |
| 2020/0302117 A1* | 9/2020 | Hu | | G16H 30/40 |
| 2020/0401835 A1* | 12/2020 | Zhao | | G06V 10/426 |
| 2021/0004577 A1* | 1/2021 | Amat Roldan | | A01K 29/00 |
| 2021/0027083 A1* | 1/2021 | Cohen | | G06V 20/70 |
| 2021/0027448 A1* | 1/2021 | Cohen | | G06F 16/5838 |
| 2021/0027471 A1* | 1/2021 | Cohen | | G06F 16/3344 |
| 2021/0103776 A1* | 4/2021 | Jiang | | G06V 20/647 |
| 2021/0192552 A1* | 6/2021 | Gugnani | | G06Q 30/0282 |
| 2021/0263962 A1* | 8/2021 | Chang | | G06F 40/30 |
| 2021/0340857 A1* | 11/2021 | Mohamed Shibly | | |
| | | | | G01N 29/4481 |
| 2022/0215201 A1* | 7/2022 | Dwivedi | | G06N 3/045 |
| 2022/0309275 A1* | 9/2022 | Kirsten | | G06V 10/235 |
| 2022/0383037 A1* | 12/2022 | Pham | | G06N 3/09 |
| 2023/0088925 A1* | 3/2023 | Sharma | | G06F 18/2431 |
| | | | | 382/156 |
| 2023/0185839 A1* | 6/2023 | Frei | | G06F 16/45 |
| | | | | 707/740 |
| 2023/0274404 A1* | 8/2023 | George | | G06V 10/82 |
| | | | | 382/109 |
| 2025/0005819 A1* | 1/2025 | Xu | | G06T 7/50 |
| 2025/0147639 A1* | 5/2025 | Hoffer | | G06F 40/30 |

FOREIGN PATENT DOCUMENTS

| | | | | | |
|---|---|---|---|---|---|
| WO | 2020026763 A1 | 2/2020 | | | |
| WO | 2020129066 A1 | 6/2020 | | | |
| WO | WO-2021242551 A1 * | 12/2021 | | | G06F 3/1454 |

OTHER PUBLICATIONS

Logan et al. "Multimodal Attribute Extraction" 31st Conference on Neural Information Processing Systems (NIPS 2017), Long Beach, Ca. pp. 1-7 (Year: 2017).*

Zhou et al. "Simplified DOM Trees for Transferable Attribute Extraction from the Web" IW3C2 Apr. 19-23, 2021, pp. 1-10 (Year: 2021).*

"Anatomy of a Bottle", Retrieved from: https://www.berlinpackaging.com/anatomy-of-a-bottle/, Oct. 20, 2019, 2 Pages.

"PASCAL-Part Dataset", Retrieved from: https://web.archive.org/web/20200610005259/https:/www.cs.stanford.edu~roozbeh/pascal-parts/pascal-parts.html, Jun. 10, 2020, 3 Pages.

Chen, et al., "Understanding the Impact of Label Granularity on CNN-based Image Classification", In Repository of arXiv:1901.07012v1, Jan. 21, 2019, pp. 1-10.

Chitturi, et al., "The Influence of Color and Shape of Package Design on Consumer Preference: The Case of Orange Juice", In International Journal of Innovation and Economic Development, vol. 5, Issue 2, Jun. 2019, pp. 42-56.

Diamond, Catherine, "Beverage Labeling", Retrieved from: https://www.labelandnarrowweb.com/issues/2013-07/view_features/beverage-labeling/, Jul. 17, 2013, 11 Pages.

Na, et al., "Automatic Segmentation of Product Bottle Label Based on GrabCut Algorithm", In International Journal of Contents, vol. 10, Issue 4, Dec. 2014, pp. 1-10.

Schoormans, et al., "Designing Packages that Communicate Product Attributes and Brand Values: An Exploratory Method", In the Journal of Design, vol. 13, Issue 1, Mar. 2010, 19 Pages.

Wu, et al., "Detectron2 Model Zoo and Baselines", Retrieved from: https://github.com/facebookresearch/detectron2/blob/master/MODEL_ZOO.md, Jul. 21, 2021, 9 Pages.

Communication under Rule 71(3) EPC, Received in European Patent Application No. 22761711.5, mailed on Oct. 10, 2025, 08 pages.

"International Search Report and Written Opinion Issued in PCT Application No. PCT/US22/038991", Mailed Date: Nov. 17, 2022, 10 Pages.

Wang, et al., "Joint Object and Part Segmentation Using Deep Learned Potentials", In Proceedings of IEEE International Conference on Computer Vision, Dec. 7, 2015, pp. 1573-1581.

* cited by examiner

ORIGINAL IMAGE

SEGMENTED IMAGE

ANALYSIS RESULTS

ORIGINAL IMAGE

SEGMENTED IMAGE

ANALYSIS RESULTS

['ORANGE', 'BLUE', 'WHITE']

800

805

10 BEER

10 BEER

['BLUE', 'BLACK', 'BROWN', 'SILVER']

810

815

11 BEER

['PURPLE', 'BLACK', 'RED', 'WHITE']

820

825

12 BEER

12 BEER

ABSTRACT

ABSTRACT : 0.2186
GEOMETRIC : 0.19
FESTIVE COLOR: 0.1813

1100

EMBOSSED

EMBOSSED : 0.177
GLOSSY : 0.1514
MATTE : 0.149

PICTORIAL

PICTORIAL : 0.1575
GOLD CAPS : 0.155
GEOMETRIC : 0.1527

ABSTRACT

ABSTRACT : 0.2186
GEOMETRIC : 0.19
FESTIVE COLOR : 0.1813

GEOMETRIC

GEOMETRIC : 0.2722
MATTE : 0.1503
GLOSSY : 0.1456

MATTE

MATTE : 0.2152
FESTIVE COLOR : 0.187
GLOSSY : 0.1785

GLOSSY

GLOSSY : 0.2627
EMBOSSED : 0.1892
MATTE : 0.1722

MATTE

MATTE : 0.2527
TEXTUAL : 0.2
EMBOSSED : 0.1486

GOLD CAPS

GOLD CAPS : 0.3071
GLOSSY : 0.1301
PICTORIAL : 0.1222

PICTORIAL

PICTORIAL : 0.2605
MATTE : 0.1581
GLOSSY : 0.1394

1200

1300

1400

1500

VISUAL ATTRIBUTE EXPANSION VIA MULTIPLE MACHINE LEARNING MODELS

BACKGROUND

Image recognition systems commonly employ machine learning models to identify different types of images, such as different animals, and even human faces. Some systems have utilized a convolutional neural network for extracting high-order semantic information and features of image data. Some systems have even created feature maps for bottle labels. However, none of the systems provide sufficient detailed features for beverage bottles that can be used for understanding beverage packaging characteristics sufficient for occasion brand-price-packaging-channel analysis.

SUMMARY

A computer implemented method includes receiving an image that includes a type of object, segmenting the object into multiple segments via a trained segmentation machine learning model, and inputting the segments into multiple different attribute extraction models to extract different types of attributes from each of the multiple segments.

DETAILED DESCRIPTION

Figure 1:
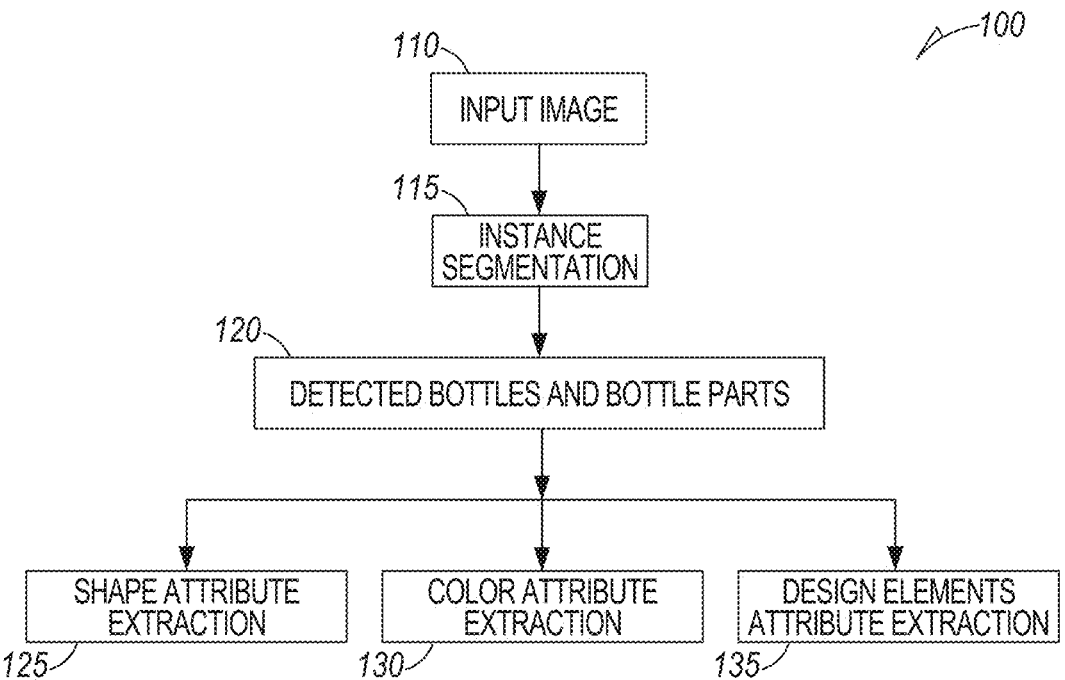
FIG. 1 is a block diagram of a system 100 for extracting three types of fine-grained attributes from objects according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

A Convolutional Neural Network (CNN) is a type of artificial neural network used in image recognition and processing that is optimized to process pixel data. Convolutional Neural Networks are the fundamental and basic building blocks for the computer vision task of image segmentation, referred to as CNN segmentation.

CNN architectures generally consist of three main layers. A convolutional layer helps to abstract an input image as a feature map via the use of filters and kernels. A pooling layer helps to down sample feature maps by summarizing the presence of features in patches of the feature map. Fully connected layers connect every neuron in one layer to every neuron in another layer.

Combining the layers of a CNN enables the designed neural network to learn how to identify and recognize an object of interest in an image. Many CNNs are built for image classification and object detection.

A CNN architecture falls short in a more complex situation where the task is to detect and segment multiple objects in an image. A Mask region based convolutional neural network (Mask RCNN) is a variant of a Deep Neural Network that detects multiple objects in an image and generates a high-quality segmentation mask for each object in the image.

At least one dataset, PASCAL PARTS, provides segmentation masks for two or more body parts of an object. For example, in the case of the object being a bottle, the bottle cap and the rest of the bottle are the two different parts of the bottle that are identified. There is still a need to identify fine-grained features of a single object, such as a bottle.

The present inventive subject matter includes a computer implemented method of performing image analysis using an architecture of machine learning models, starting with a shape model trained on shape labeled objects in images to identify shapes in the objects. The identified shapes are used in multiple further bootstrapped models adapted to generate fine grain features of objects in images input into the models.

FIG. 1 is a block diagram of a system 100 for extracting three types of fine-grained attributes from objects. In one example, the objects are bottles, and the types of fine-grained attributes include shape attributes, color attributes and design element attributes.

In a first stage, given an input image 110, a first instance segmentation model 115 is applied to detect objects and object parts in the image. For purposes of illustration, bottles are used as an example of an object with different parts of the bottle being object parts. In further examples, other objects may be processed in a similar manner. The instance segmentation model both detect bottles and provides a way to divide the bottle shape into different segments. In a second stage an output 120 from the segmentation model 115 that includes detected bottles and bottle parts is provided as an input to a shape analysis model 125, color analysis model 130, and design elements analysis models 135.

Figure 2:
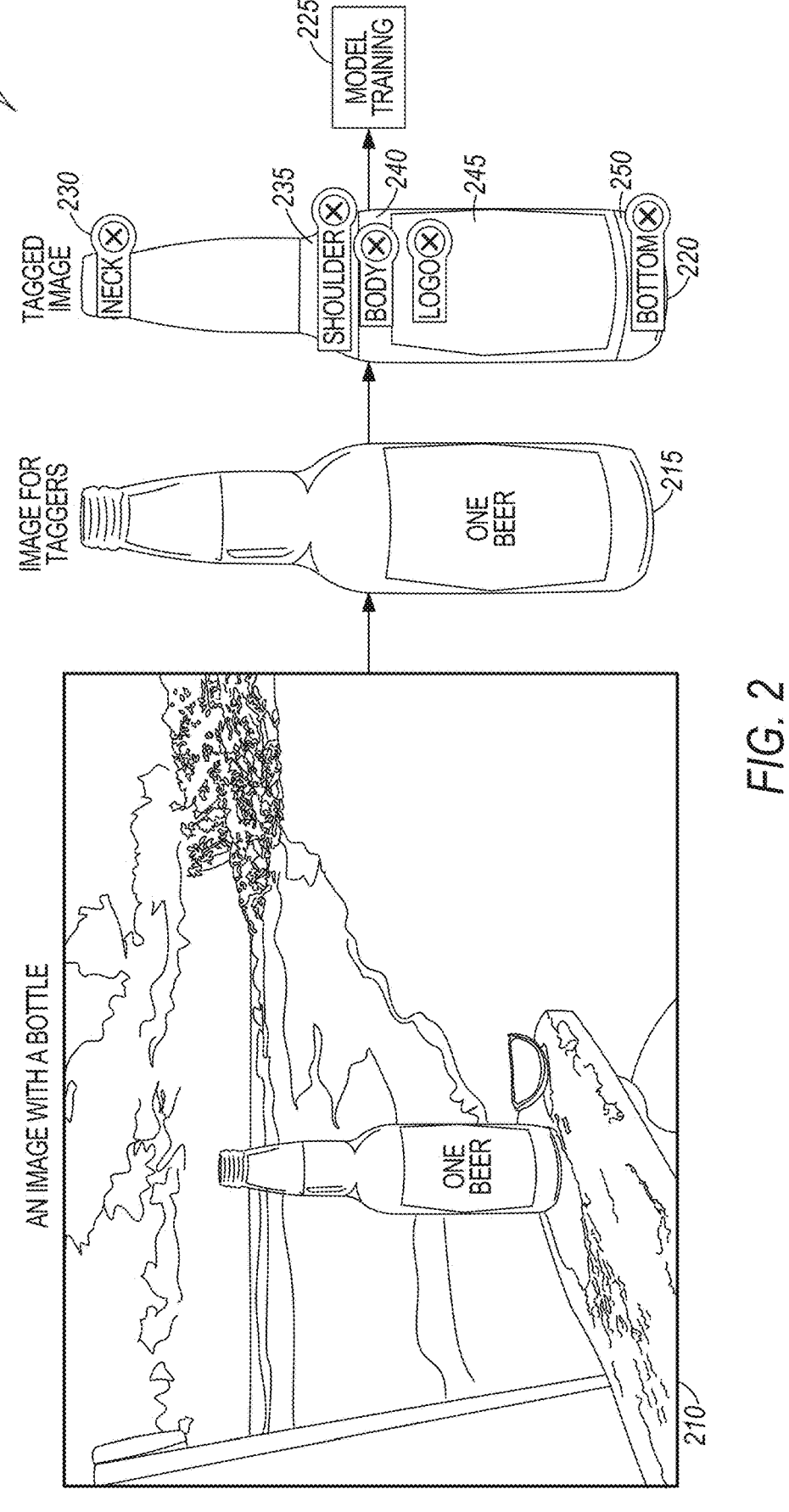
FIG. 2 is a flow diagram illustrating generation of a training dataset and training, generally at of an instance segmentation model according to an example embodiment.

FIG. 2 is a flow diagram illustrating generation of a training dataset and training, generally at 200, of the instance segmentation model 115. In one example, a dataset may be built based on a public dataset. Images 210 with bottles may be selected using a public model Mask-RCNN that is pretrained on MS COCO (Microsoft Common Objects in Context) dataset. The pretrained Mask-RCNN model is used to segment the images and generate bounding boxes and masks for the "Bottle" class. According to these bounding boxes, the images are cropped as indicated at 215 to a good size for tagging at 220 based on selected images. Model training 225 is then performed based on the tagged images.

In one example, a dataset may include 566 images, or other desired number of images. The images may be fine-grained tagged as illustrated at 220. The tagging results are then reviewed, and a dataset is created with tagged images and metadata for the model training 225. The tags at 220 include neck 230, shoulder 235, body 240, logo 245, and bottom 250. In other examples, other features may be tagged.

The dataset images may be manually tagged using 15 Classes to create a dataset. The classes include: Bottle, Neck, Shoulder, Body, Bottom, Top_0, Top_1, Top_2, Top_3, Logo_0, Logo_1, Logo_2, Logo_3, Logo_4, Logo_5. Tops classes include four different types of bottle caps with different styles. The six logo classes are for logos with different styles.

The entire dataset is split into three sub-datasets. A training sub-dataset may include 425 tagged images. A validation sub-dataset may include 71 tagged images, and a test sub-dataset may include 70 tagged images. The numbers in each sub-dataset may be varied in further examples.

Each sub-dataset includes the classes, referred to as categories, and the number of instances occurring in the respective sub-datasets. For example, the training sub-dataset includes 425 bottles, 425 Necks, 425 shoulders, 425 bodies, 400 bottoms, 204 Top_0, 2 Top_1, 13 Top_2, 7 Top_3, 419 Logo_0, 92 Logo_1, 68 Logo_2, 53 Logo_3, 12 Logo_4, and 75 Logo_5.

In one example, instance segmentation model 115 is a modified Mask-RCNN model that had been pre-trained for image instance segmentation on 91 classes for the public MS COCO (Microsoft Common Objects in Context) dataset. The original model can only recognize the whole bottles in the images but cannot segment the bottles into more concrete parts. The number of classes for the Mask-RCNN model and their corresponding layers in the model were modified, and the model was fine-tuned using the sub-datasets.

In some examples, a base model architecture may be modified to generate the instance segmentation model 115. For example, the base model: Mask-RCNN (R50-FPN 3x, BOX AP:41.0 MASK AP:37.2, based on Detectron2), pre-trained on the COCO dataset with 91 classes.

Figure 3:
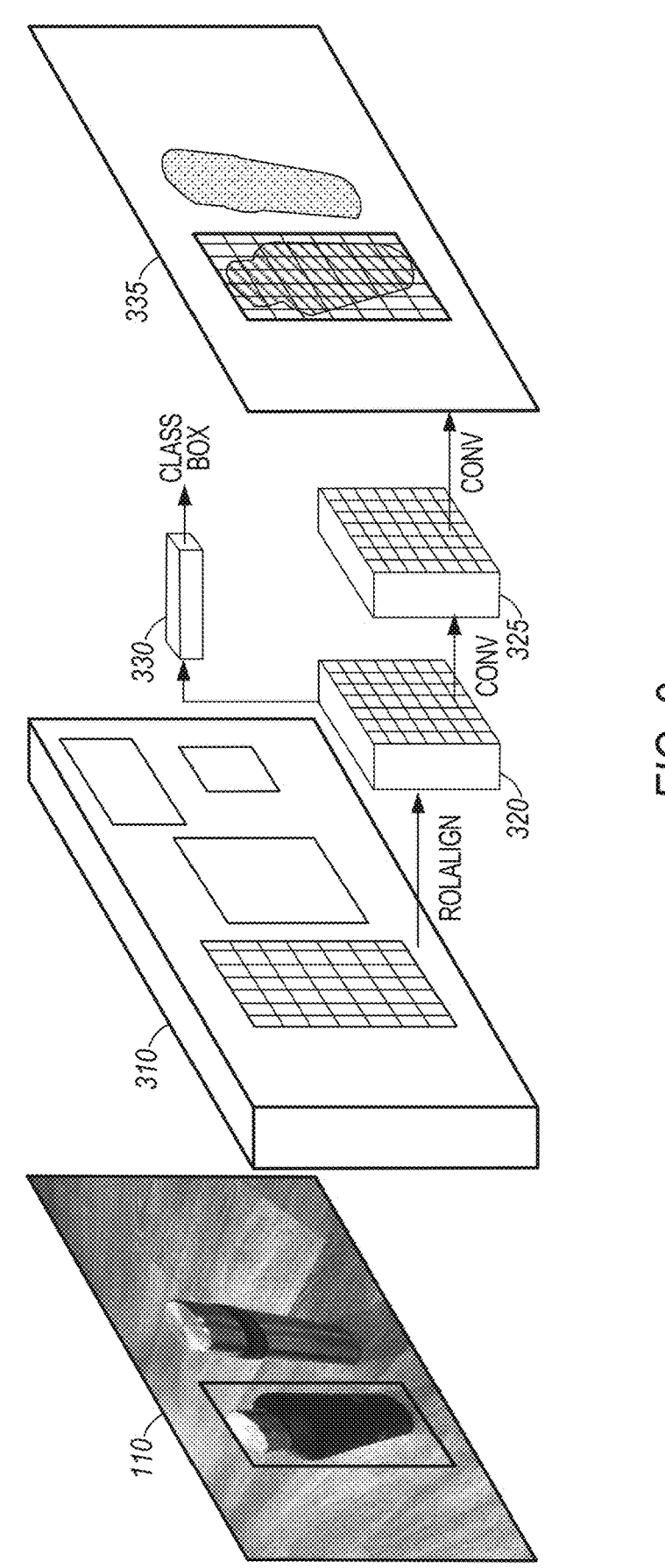
FIG. 3 is a block diagram of an instance segmentation model according to an example embodiment.

FIG. 3 is a block diagram of the instance segmentation model 115. Model 115 is a modification of a base model Mask-RCNN (R50-FPN) which is a classic image instance segmentation model and uses ResNet50-Feature Pyramid Network (FPN) as its backbone.

Input images 110 are provided and regions of interest are identified and aligned at 310. In a mask branch, segmentation masks 315 are generated on each Region of Interest (RoI) via convolution layers 320 and 325, in parallel with an existing branch 330 for classification and bounding box regression. The mask branch is a small fully connected network (FCN) applied to each RoI, predicting a segmentation mask 335 in a pixel-to-pixel manner.

For the model that is pretrained on COCO dataset, it can process an input image and output the bounding boxes and segmentation masks for pre-defined 91 classes, such as person, horse, backpack, and bottles. However, it won't give fine-grained results for these classes, which hinders efforts to analyze bottle shapes and other features in detail. To utilize the pre-trained model and apply it to bottles, the model's architecture is changed for the desired 15 classes and the model is fine-tuned utilizing the sub-datasets.

To change and fine-tune the model 115, the number of classes is replaced to be 15 classes and corresponding layers affected by this configuration in the model are modified, so that it can fit the bottle instance segmentation use case. The model was initialized with parameters/weights from the pretrained Mask-RCNN model for the unchanged layers in the model, so that the modified model can utilize the pre-learned parameters/weights. The model parameters/weights are then fine-tuned on the tagged training dataset so that the model can perform the instance segmentation for the shape analysis task.

Figure 4:
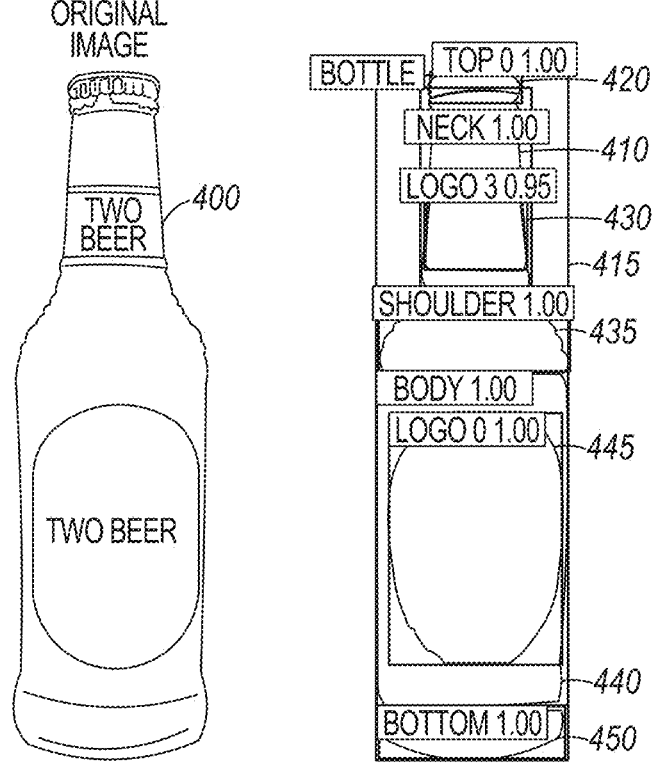
FIG. 4 illustrates a cropped input image of a bottle, followed by a segmented version of the image according to an example embodiment.

The final model is selected based on the validation set and evaluated on the test dataset. FIG. 4 illustrates a cropped input image 400 of a bottle, followed by a segmented version 410 of the image. The segmentation model 115 provides bounding boxes and segmentation masks as output. Version 410 shows a bottle_1 bounding box 415, bottle Top_0 bounding box 420, neck_1 bounding box 425, Logo_3 bounding box 430, shoulder bounding box 435, body bounding box 440, Logo_1 bounding box 445, and bottom bounding box 450.

Common metrics for bounding box detection include average precision (AP) and Average Recall (AR) at different cases, i.e., different IoU, area, and maxDets. IoUs are Intersection over Union values of the predicted bounding boxes and their ground truth bounding boxes. An IoU=0.5 means that only the bounding boxes (generated by the fined-tuned Mask-RCNN) that have IoU value greater than or equal to 0.5 are considered as Positive for computing AP and AR. For IoU=0.50:0.95 case, AP and AR value is the mean of the APs with ten IoU thresholds of 0.50:0.05:0.95. Area=small, medium, and large means that AP and AR values are computed for small, medium, and large objects, respectively. Small, medium, and large objects may be defined by their areas as follows: 1) small object: area<$32^2$, 2) medium object: $32^2$<area<$96^2$, 3) large object: area>$96^2$. The area is measured as the number of pixels in the segmentation mask. An area=all case means that the AP and AR values are computed for all objects. For maxDets=1, 10, 100 cases, AP and AR values are computed given at most 1, 10, 100 top-scoring detections per image.

Common metrics for segmentation mask identification may also include average precision (AP) and Average Recall (AR) at different cases, i.e., different IoU, area, and max-Dets. Here IoUs are Intersection over Union values of the predicted masks and their ground truth masks. The concepts of the area and maxDets are similar to those for bounding box detection.

Guidelines for tagging images with labels may be used to ensure the dataset is correctly labeled. Polygons are used to mark 15 classes in each training dataset image. Those classes are "Bottle", "Neck", "Shoulder", "Body", "Bottom", "Top" subclasses, and "Logo" subclasses. Top_0, Top_1, Top_2, and Top_3 is for the caps with different styles. Logo_0, Logo_1, Logo_2, Logo_3, Logo_4, and Logo_5 are for logos with different styles.

Figure 5A:
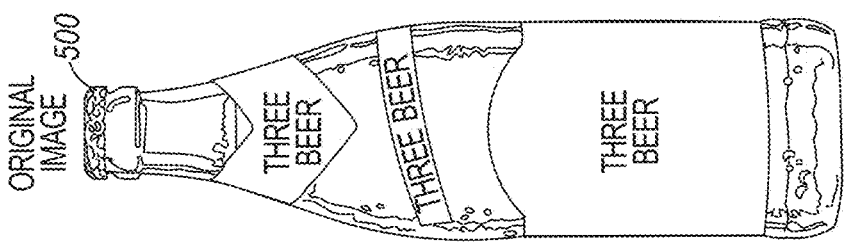
FIGS. 5A, 5B, 5C, 5D, 5E, 5F, and 5G are examples of tagged images of bottles according to an example embodiment.

Each label includes a polygon and a corresponding one of the 15 classes. Some examples for how the images should be tagged are provided in FIGS. 5A, 5B, 5C, 5D, 5E, 5F, and 5G. On the left-hand FIG. 5A, the original image 500 is shown for tagging. The polygon tags that correspond to the masks are also shown on a body shape representation 510. "Top" subclasses are for caps with different styles. The "Neck" is for the bottleneck. The "Shoulder" connects the "Neck" and the bottle's main "Body" part, and the diameter gradually increases when it goes to the "Body" part. The "Bottom" part is a part below the bottle's "Body".

Labels for logos are shown at 515, and a label for the bottle itself is shown at 520. The different types of labels will be described below.

Figure 5B:
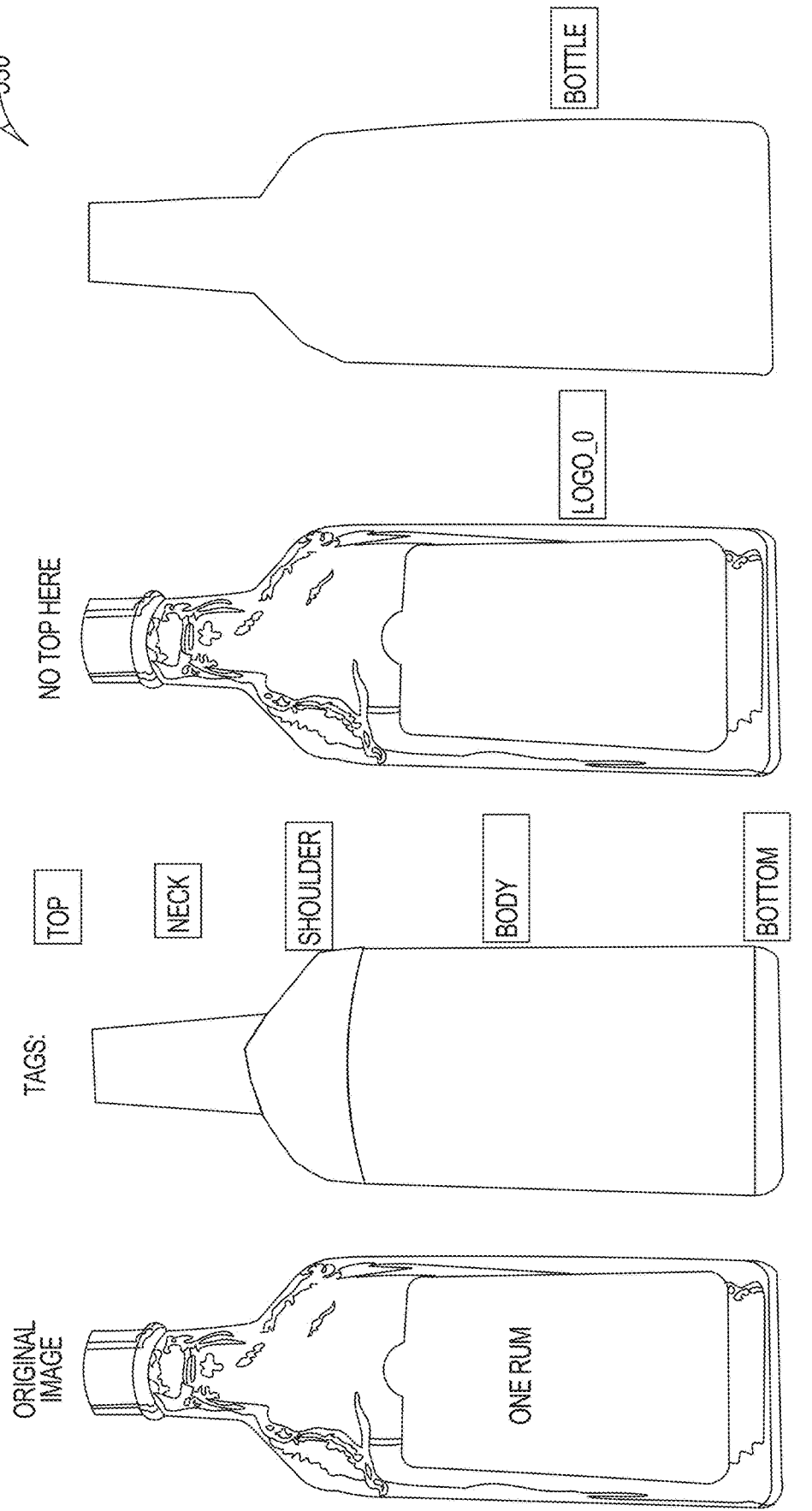

FIG. 5B shows images for a different shaped bottle generally at 530 with no top.

Figure 5C:
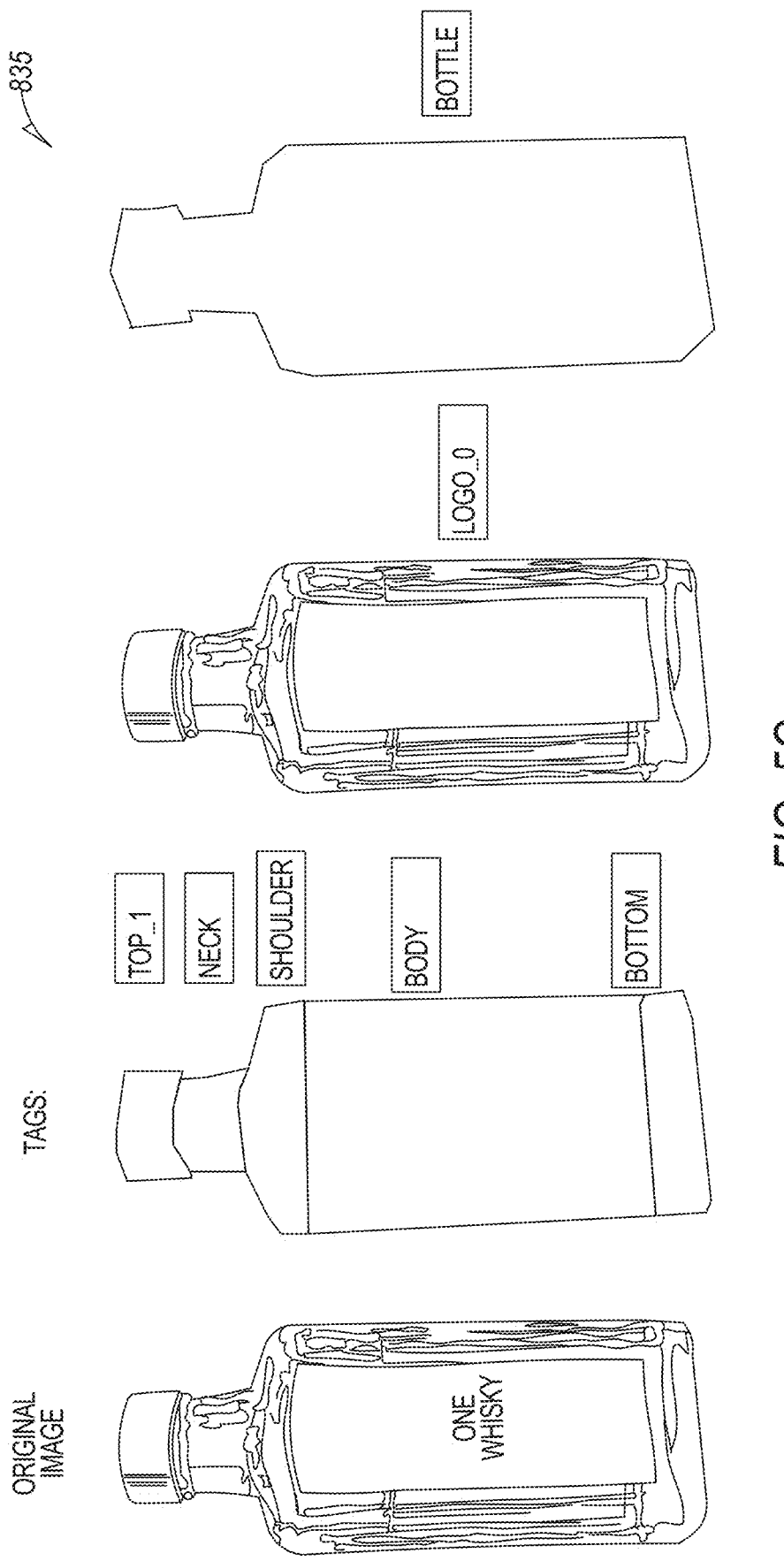

FIG. 5C shows images for yet a different shaped bottle generally at 535 with a top of class Top_1.

Figure 5D:
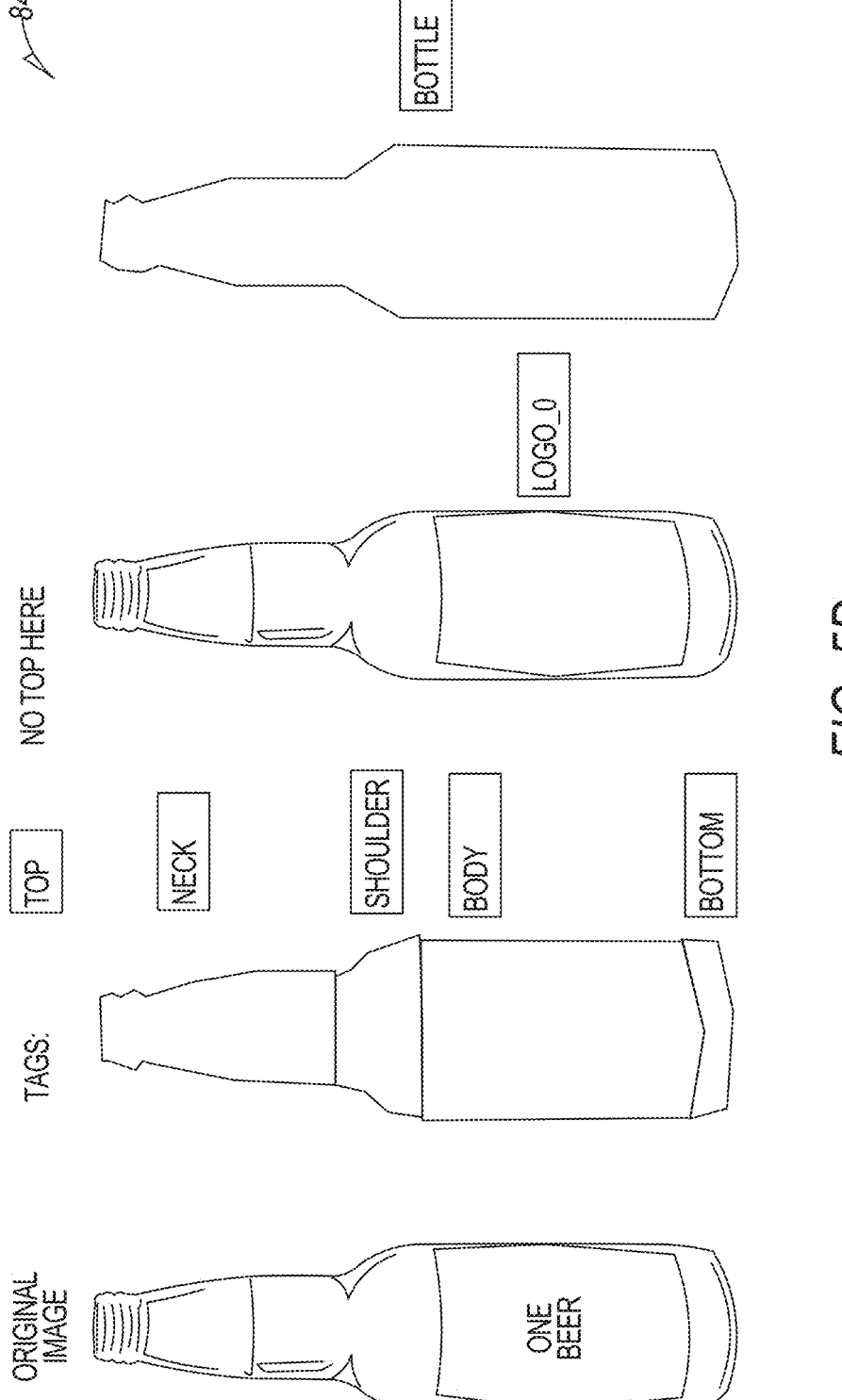

FIG. 5D shows images for a bottle generally with no top generally at 540.

Figure 5E:
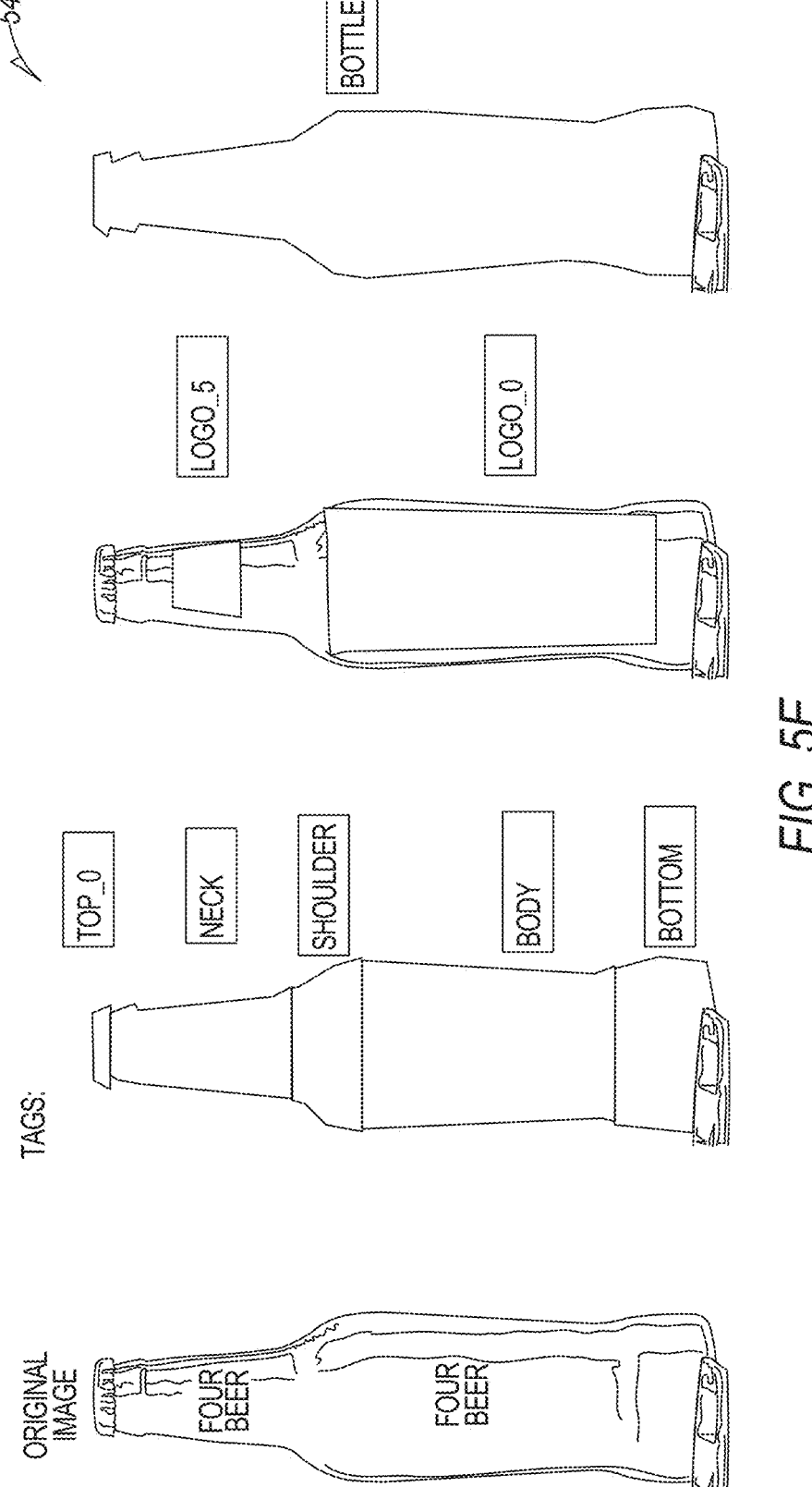

FIG. 5E shows images for yet a different shaped bottle generally at 545 with a top of class Top_0.

Figure 5F:
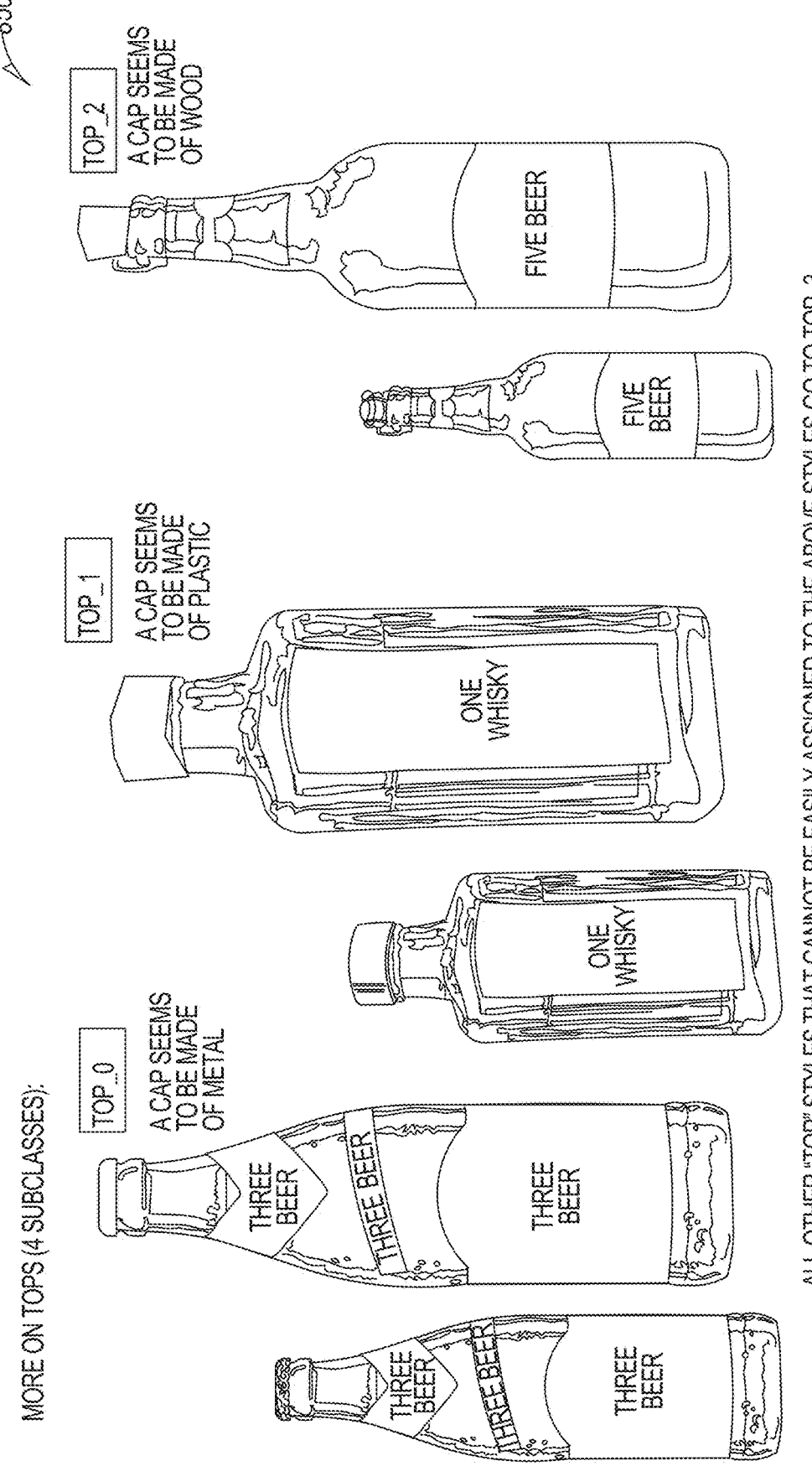

FIG. 5F shows images for different shaped bottles generally at 550. The bottles in FIG. 5F have tops of classes Top_0 (a cap that seems to be made of metal), Top_1 (a cap that seems to be made of plastic), and Top_2 (a cap that seems to be made of wood). A remaining class to top is Top_3 which may be used as a label for top styles that cannot be easily assigned to the other classes.

Figure 5G:
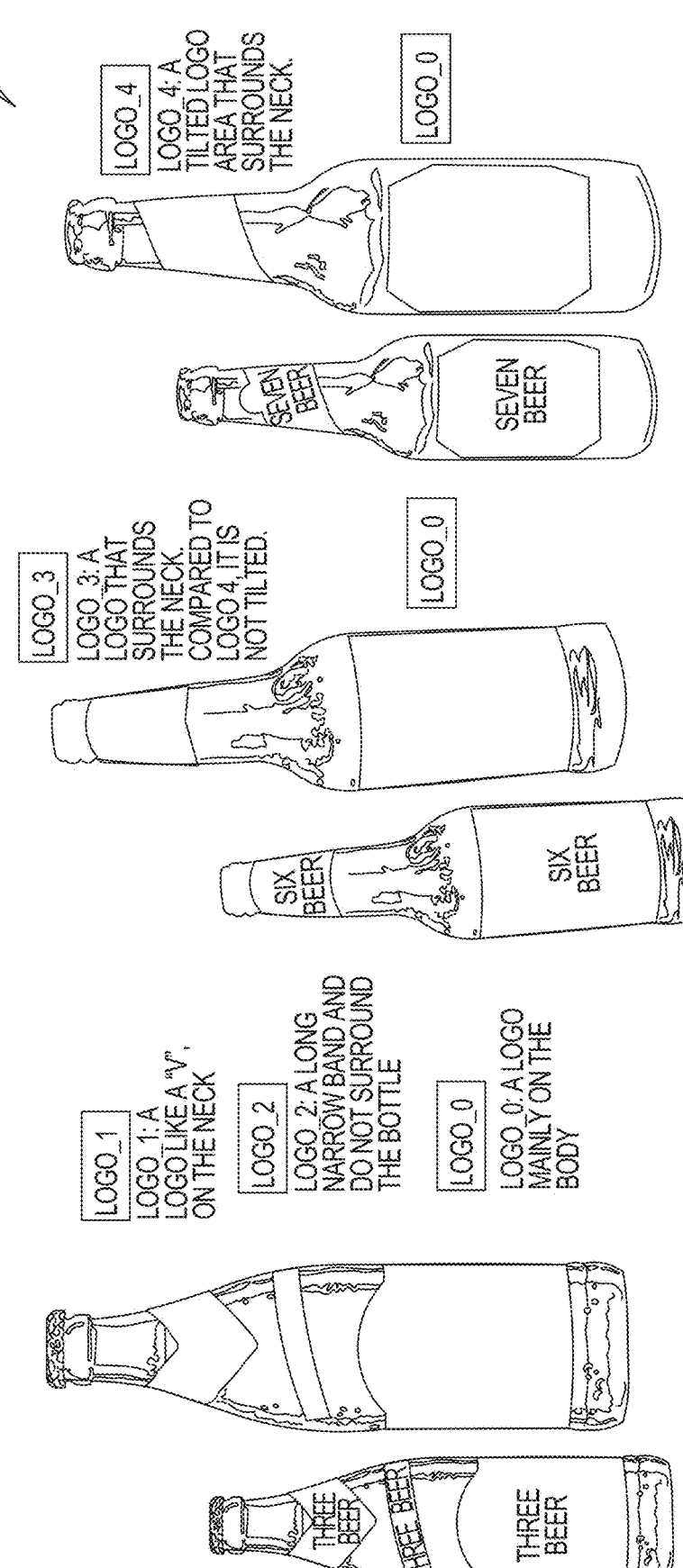

FIG. 5G shows images for a different types of logos at 555.

There are six logo subclasses (Logo_0, Logo_1, Logo_2, Logo_3, Logo_4, Logo_5).

Logo_0 is a logo mainly on the body.

Logo_1 is a logo like a "V" on the neck.

Logo_2 is a logo that is a long narrow band and does not surround the bottle.

Logo_3 is a logo that surrounds the neck, and it is not tilted.

Logo_4 is a logo that surrounds the neck, and it is tilted.

Logo_5 is reserved for a logo does not belong to the above 5 categories.

Figure 6A:
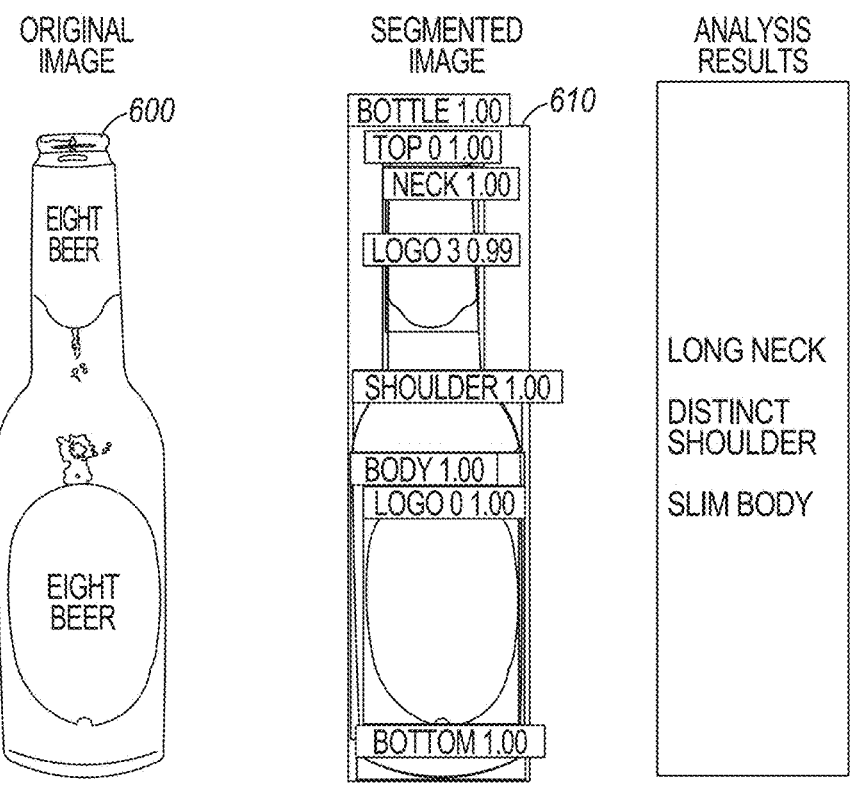
FIGS. 6A. 6B, and 6C are examples of bottles with various logo styles and corresponding logos according to an example embodiment.
Figure 6B:
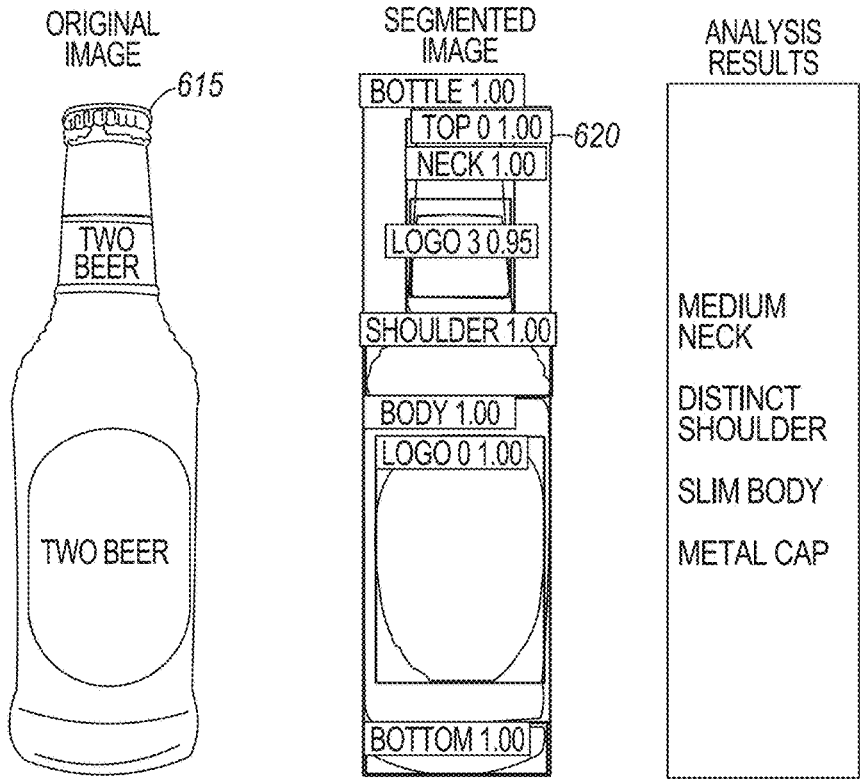
Figure 6C:
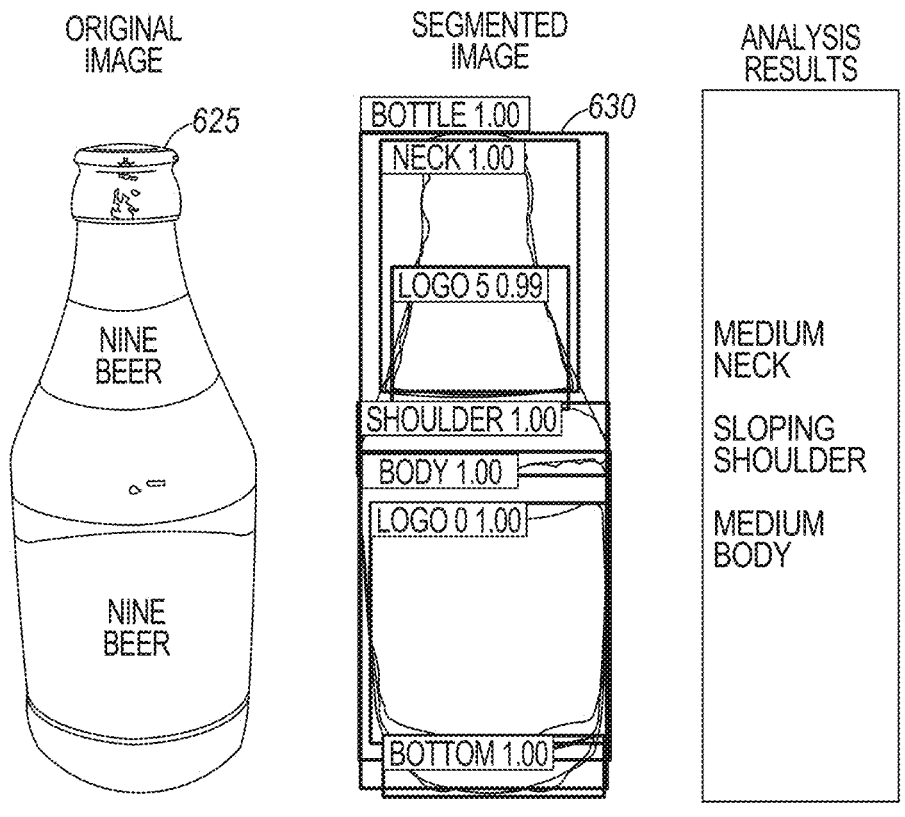

Logo styles and corresponding labels as well as bottle shapes are illustrated in FIGS. 6A, 6B, and 6C. FIG. 6A illustrates an image 600 of a bottle that includes a long neck, distinct shoulder, and a slim body. A segmented image 610 of the bottle shows a logo on the neck labeled as Logo_3, and a logo on the body labeled as Logo_1.

FIG. 6B illustrates a bottle image 615 and segmented image 620 having two different logos, Logo_3 and Logo_1. The bottle has a medium neck, distinct shoulder, slim body, and a metal cap.

FIG. 6C illustrates a bottle image 625 and segmented image 630 having two different logos, Logo_5 and Logo_1. The bottle has a medium neck, sloping shoulder, and medium body.

Once the training dataset is properly labeled and has been used to fine-tune segmentation model 115, the model 115 may be run to obtain segmentation results which may be further fine-tuned for a cleaner segmentation. Such fine tuning may include filtering out the segmentation results with scores less than a threshold of 0.7. The score threshold may be selected based on experience. One segmentation is kept based on the result with highest score for each "Bottle", "Neck", "Shoulder", "Body", and "Bottom" tags. For "Top" subclasses, one top style is kept with the highest score. For "Logo" subclasses, if two segmentation results (masks) have Intersection over Union (IOU) greater than 0.7, the mask with greater score will be kept.

Once the segmentation has been performed, the segments are provided via the shape analysis model 120 for "Top", "Neck", "Shoulder", and "Body" shape analysis to generate a description of a bottle's shape. "Metal cap", "plastic cap", "wood cap", or "unique cap" may be assigned for "Top" if any subclass of "Top" are available in the segmentation results. This assignment is directly decided by the label of the "Top" subclass in the segmentation results, and is corresponding to "Top_0", "Top_1", "Top_2", or "Top_3", respectively.

The shape analysis model 120 may utilize the segments to measure one or more ratios of measurements of the portions of the corresponding bounding box to determine certain shapes.

"Long neck", "medium neck", or "short neck" for "Neck" are assigned by the shape analysis model 120 if the height-to-width ratio (determined from pixel data) of Neck's predicted bounding box fits in the following intervals:

"long neck": the ratio is greater than 2;

"medium neck": the ratio is less than or equal to 2 but greater than 1;

"short neck": the ratio is less than or equal to 1.

"Sloping shoulder" or "distinct shoulder" is assigned to "Shoulder" if the ratio of the width of Shoulder's bounding box to the width of Neck's bounding box fits in the following intervals:

"sloping shoulder": the ratio is less than 1.55;

"distinct shoulder": the ratio is greater than or equal to 1.55.

"Slim body", "medium body", or "fat body" is assigned to "Body" if the height-to-width ratio of Body's predicted bounding box fits in the following intervals:

"slim body": the ratio is greater than 1.5;

"medium body": the ratio is less than or equal to 1.5 but greater than 1.1;

"fat body": the ratio is less than or equal to 1.1.

The analysis, when performed on the image 600 of the bottle in FIG. 6A identifies that the bottle includes a long neck, distinct shoulder, and a slim body. The bottle in image 615 of FIG. 6B has a medium neck, distinct shoulder, slim body, and a metal cap. The bottle in image 625 of FIG. 6C has a medium neck, sloping shoulder, and medium body.

Given an input image the color analysis model 130 may be used on salient regions to provide color analysis. In one example, the color analysis model 130 may be an unsupervised model.

Salient regions can be obtained by a saliency model or by using the output segments from the segmentation model 115. In other words, a salient region is a part of the object in which there is an interest in obtaining more information about the part of the object, such as the predominant color of that part of the object. One example is a label on a bottle.

A dictionary of colors may be defined as target colors. Embeddings may be extracted for these target colors. For each color in the dictionary text embedding may be a 512 dimensional feature vector of float numbers. Similarly, for the salient region, image embedding may be extracted as a 512-dimensional feature vector.

To extract image and text embeddings, a CLIP (Contrastive Language Image Pretraining) Model may be used. CLIP model is trained with image-caption pairs of millions of images. It projects image embeddings and text embeddings in the same embedding space, enabling the text and the image embeddings to be compatible with each other, e.g. the image of a dog and the word dog would be closer to each other in the embedding space, and the image of a cat and the word cat would be closer to each other and farther from the word dog and the image of a dog. This type of powerful model may be used for color analysis.

After extracting image and text embeddings a cosine distance between the embeddings may be calculated. If the distance between a color text and the image embeddings is above a certain threshold, that image is considered to have the corresponding color present in the image.

Figure 7:
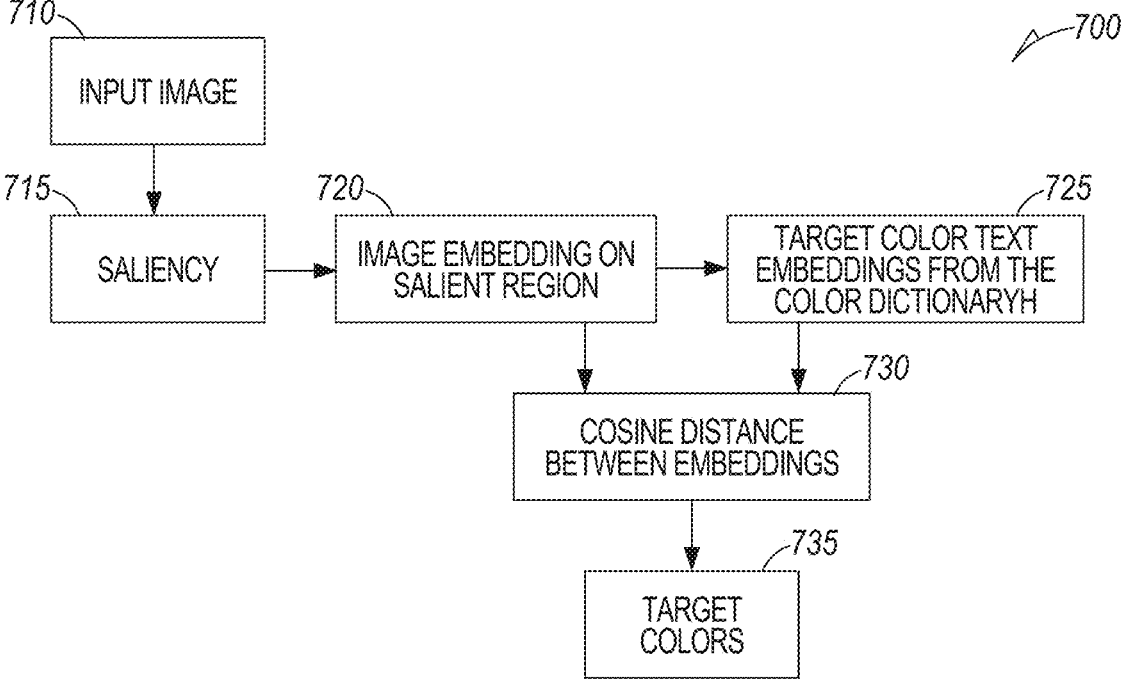
FIG. 7 is a block diagram an example color analysis model architecture according to an example embodiment.

FIG. 7 is a block diagram an example color analysis model 1000 architecture. An input image 710 is provided to a saliency model 715 to identify salient regions. Image embeddings on the salient region are extracted at 720. The image embeddings and target color text embeddings 725 from the color dictionary are provided to a distance detection function 730 to determine cosine distance, or other desired type of distance, between the embeddings. The closest embeddings result in an output of the target colors at 735.

Figures 8A, 8B, 8C:
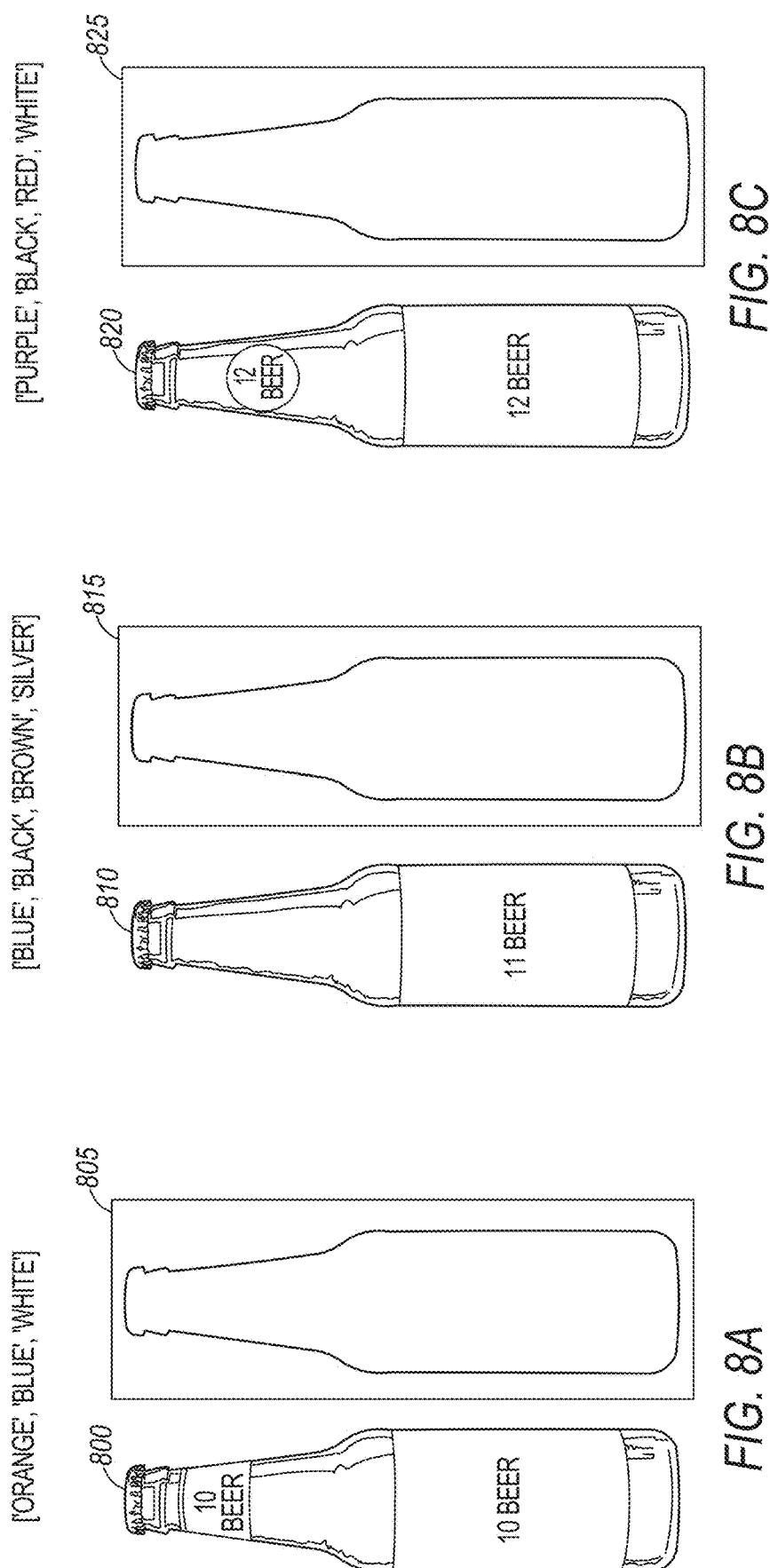
FIGS. 8A, 8B, and 8C illustrate images of bottles with masks identifying salient regions according to an example embodiment.

FIG. 8A illustrates an image 800 of a bottle with a mask 805 identifying a salient region of the bottle comprising the entire bottle. Running the color analysis model results in orange, blue, and white colors being the predominant colors in descending order of area.

FIG. 8B illustrates an image 810 of a bottle with a mask 815 identifying a salient region of the bottle comprising the entire bottle. Running the color analysis model results in blue, black, brown, and silver colors being the predominant colors in descending order of area.

FIG. 8C illustrates an image 820 of a bottle with a mask 825 identifying a salient region of the bottle comprising the entire bottle. Running the color analysis model results in purple, block red, and white colors being the predominant colors in descending order of area.

Figure 9:
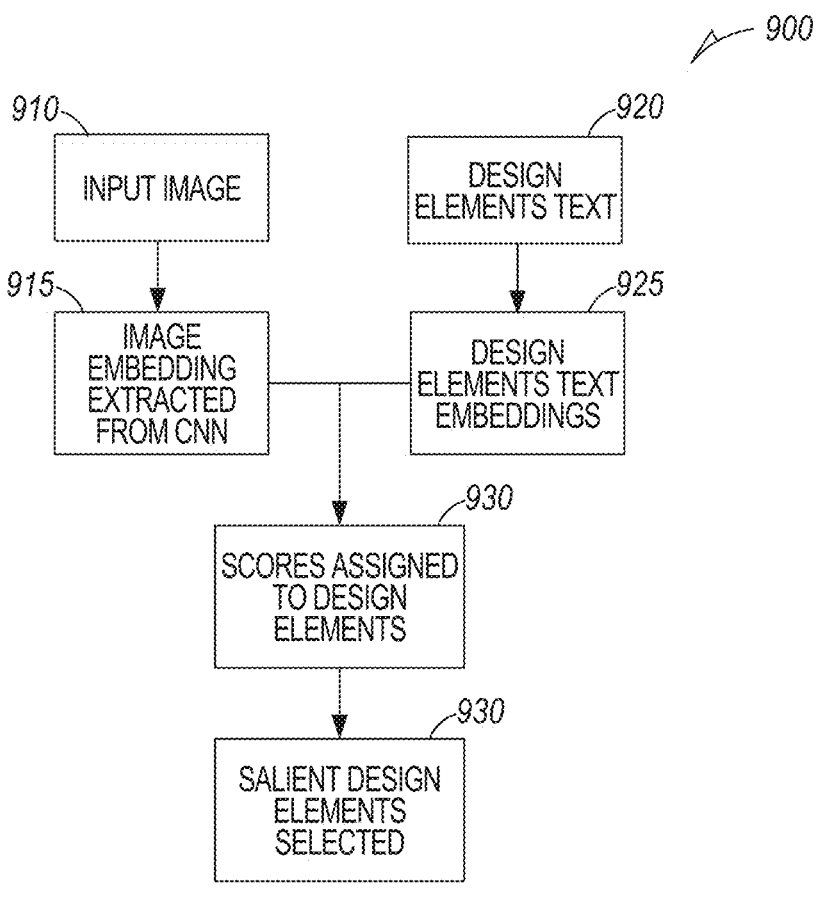
FIG. 9 is a block flow diagram illustrating fine grained design element attribute extraction from objects in images according to an example embodiment.

FIG. 9 is a block flow diagram illustrating fine grained design element attribute extraction from objects in images generally at 900. Design elements capture the main design theme of an object's shape. An input image 910 is the segmentation output (detected bottle and bottle part segments).

Design elements may be extracted from logos on a bottle in one example. Shape attributes and color attributes capture visually important characteristics of the bottle, however, they lack the details on the main design theme that a beer bottle might have. For example, embossing on the bottle logo, if the logo is more graphical or more text heavy, or if the bottle is glossy or more matte.

Image embeddings are extracted from the model at 915. Design element text 920 is used to create design element text embeddings 925 by the model. The image and text embeddings have scores assigned at 930, which are then used to select salient design elements at 935.

In one example, the following type of design elements are of interest for beer bottles are included as labels.

'textual': Text heavy logo

'Colorful (festive color)': Very rich in colors,

'glossy': Shiny glossy bottle surface,

'pictorial': Graphic logo on the bottle,

'matte': Matte bottle surface,

'geometric': Geometric patterns on the logo,

'pastel': pastel colors on the bottle,

'abstract': abstract logo design,

'embossed': if the bottle has the embossing

Design element models can be trained in either a supervised or an unsupervised manner. A supervised training uses a multi-label dataset labeled with the labels mentioned above (in each image there can be more than one type of design element).

Training in an unsupervised manner does not need training data with labels. Similar to a color analysis model, an unsupervised version of design element model uses CLIP model to predict a given list of design elements by assigning likelihood scores to each design element and selecting attributes that are above certain threshold. For example, a beer bottle label may have these salient design elements: abstract, geometric, and festive color.

Figure 10:
FIG. 10 is an image 1000 of a bottle having a salient design element of abstract according to an example embodiment.

FIG. 10 is an image 1000 of a bottle having a salient design element of abstract. The relative scores for the beer bottle label were abstract: 0.2186, geometric: 0.19, and festive color: 0.1813. As abstract has the highest score, the model provides "abstract" as the salient design element.

Figure 11A:
FIGS. 11A and 11B include example design element output for design element model testing according to an example embodiment.
Figure 11A:
Figure 11A:
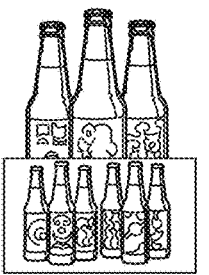
Figure 11A:
Figure 11A:
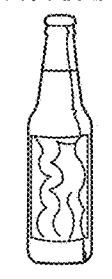
Figure 11A:
Figure 11A:
Figure 11A:
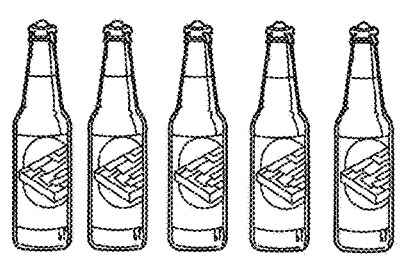
Figure 11A:
Figure 11A:
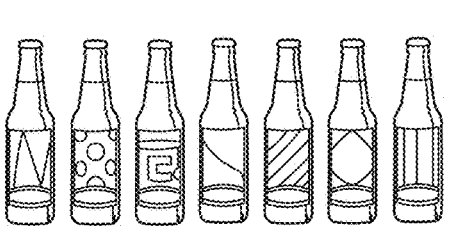
Figure 11A:
Figure 11A:
Figure 11B:
Figure 11B:
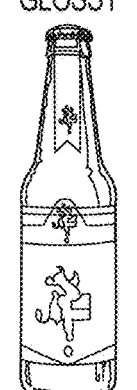
Figure 11B:
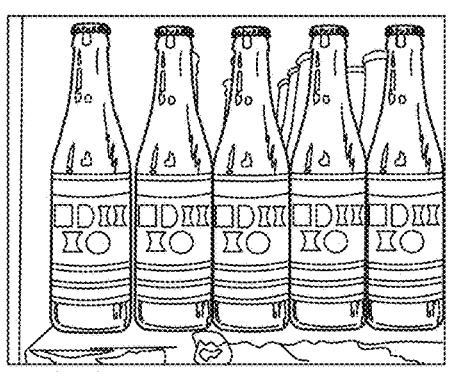
Figure 11B:
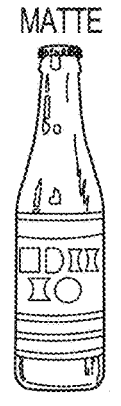
Figure 11B:
Figure 11B:
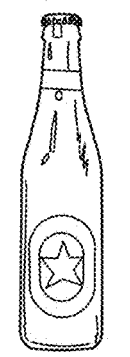
Figure 11B:
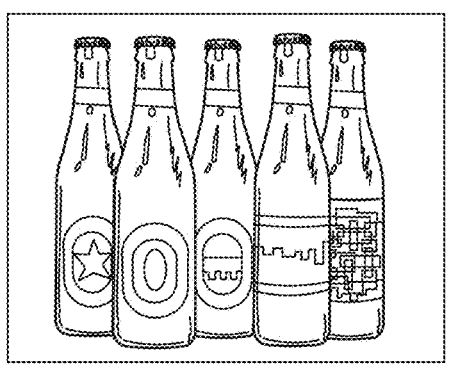
Figure 11B:
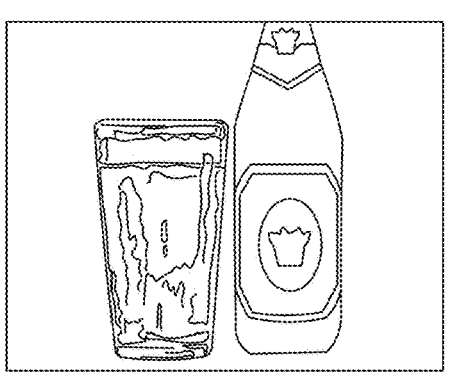
Figure 11B:
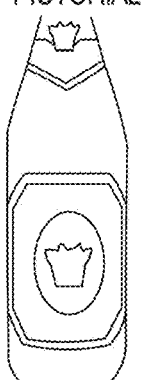

FIGS. 11A and 11B include example design element output 1100 for design element model testing on a dataset containing 709 images. The testing accuracy score was obtained as follows:

Textual:
accuracy 0.8255813953488372
number of items 172
Colorful, Festive:
color accuracy 0.35555555555555557
number of items 45
Glossy:
accuracy 0.8641975308641975
number of items 81
gold cap:
accuracy 0.8333333333333334
number of items 24
Pictorial:
accuracy 0.7578947368421053
number of items 95
Matte:
accuracy 0.8048780487804879
number of items 82
Geometric:
accuracy 0.7857142857142857
number of items 42
Pastel:
accuracy 0.7878787878787878
number of items 33
Abstract:
accuracy 0.7894736842105263
number of items 38
Embossed:
accuracy 0.6907216494845361
number of items 97

Each of the images includes associated scores for the different design elements, with the highest score selected for each image.

Figure 12:
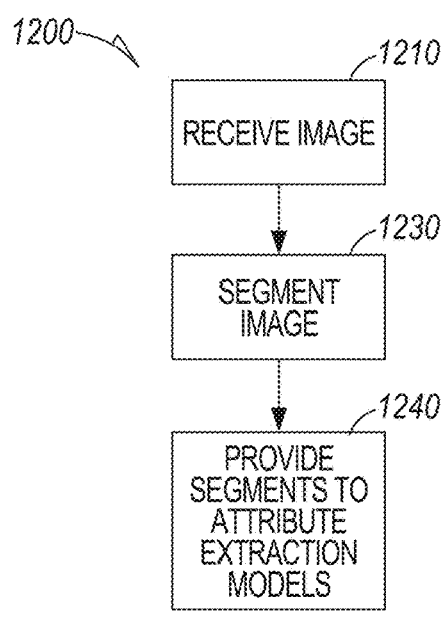
FIG. 12 is a flowchart illustrating a method 1300 of extracting fine-grained attributes for objects in images according to an example embodiment.

FIG. 12 is a flowchart illustrating a method 1200 of extracting fine-grained attributes for objects in images according to an example embodiment. At operation 1210 an image is received. The image includes a type of object, such as a bottle for example. The object is segmented into multiple segments at operation 1220 via a trained segmentation machine learning model. In one example, the trained segmentation machine learning model has been trained on multiple images of the type of object that are labeled with multiple tagged segments identified by bounding boxes.

The trained segmentation machine learning model may be a mask-recurrent convolutional neural network having classes corresponding to the multiple segments of the object. The type of object comprises a bottle and wherein the tags comprise classes including bottle, neck, shoulder, body, top, and logo. The top class includes multiple different top classes, and the logo class includes multiple different logo classes.

At operation 1230, the segments are input into multiple different attribute extraction models to extract different types of attributes from each of the multiple segments. The attribute extraction models may include one or more of a shape attribute extraction model, a color attribute extraction model, and a design elements attribute extraction model.

Figure 13:
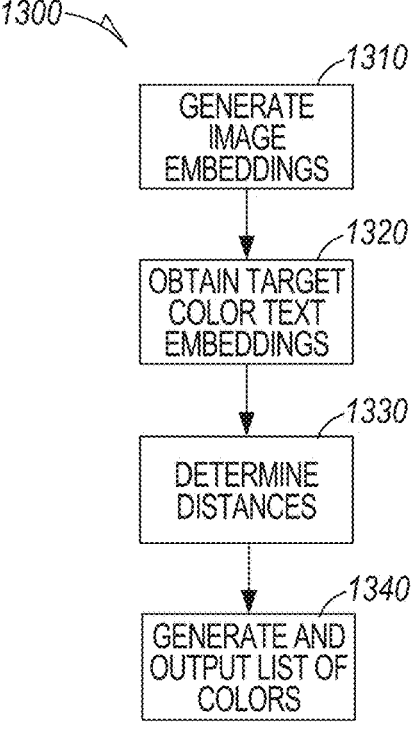
FIG. 13 is a flowchart illustrating a method of extracting colors from segments according to an example embodiment.

FIG. 13 is a flowchart illustrating a method 1300 of extracting colors from segments. The color attribute extraction model generates image embedding on each salient region of the image at operation 1310, obtains target color text embeddings in the same embedding space at operation 1320, and at operation 1330, determines distance differences between the image embeddings and target color text embeddings. Method 1300 outputs target colors at operation 1340 based on the distance differences. The color attribute extraction model is an unsupervised model and wherein a distance difference, such as based on cosine distance, is compared to a threshold to determine that a color is present in a salient region corresponding to one of the segments.

In one example, the color attribute extraction model generates a list of colors at operation 1340 in descending order of area covered by each color in a salient region.

Figure 14:
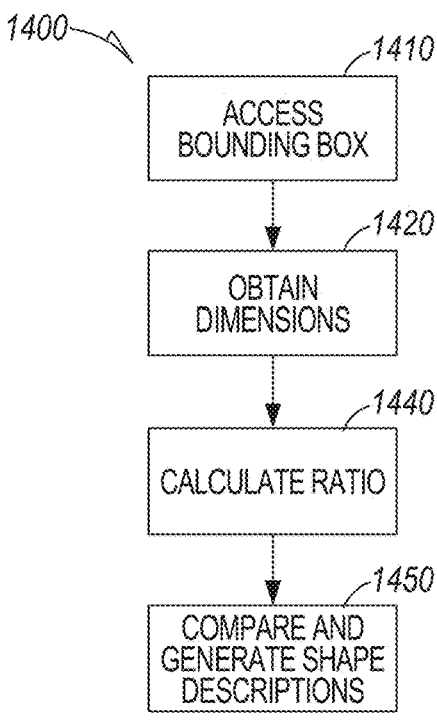
FIG. 14 is a flowchart illustrating a method for generating shape descriptions of objects in images according to an example embodiment.

FIG. 14 is a flowchart illustrating a method 1400 for generating shape descriptions of objects in images. In one example, method 1400 accesses a bounding box of a segment at operation 1410. At operation 1420, dimensions of the bounding box are obtained. At operation 1430, a ratio of selected dimensions are then calculated. The ratio is compared to selected threshold ratios to generate shape descriptions at operation 1440 corresponding to such ratios. Each segment may be processed by method 1400 to obtain shape descriptions. Example shape descriptions are identified above for various bottles.

Figure 15:
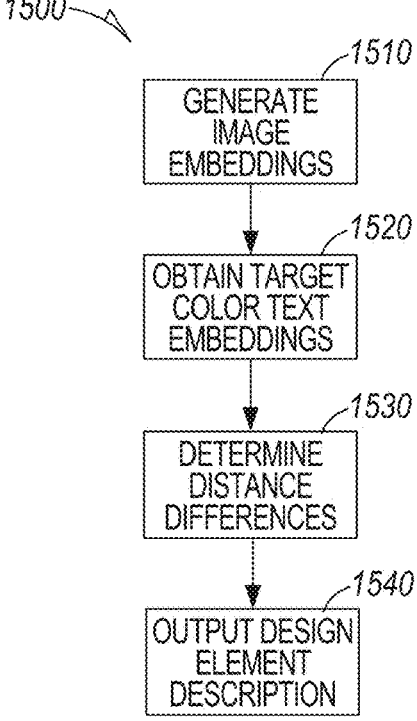
FIG. 15 is a flowchart illustrating a method for generating descriptions of design elements using a design elements attribute extraction model according to an example embodiment.

FIG. 15 is a flowchart illustrating a method 1500 for generating descriptions of design elements using a design elements attribute extraction model. In one example, the design elements attribute extraction model is an unsupervised model that compares image embeddings to design element text embeddings in the same embedding space to select salient design elements.

The design elements attribute extraction model generates image embedding on each salient region of the image at operation 1510, obtains target design element text embeddings in the same embedding space at operation 1520, and at operation 1530, determines distance differences between the image embeddings and target design element text embeddings. Method 1500 outputs a salient design element description at operation 1540 based on the distance differences.

In one example, the type of object comprises a bottle and the design elements capture a main design theme of the bottle's shape as function of a highest score for each design theme.

A Consumer beverage maker's success relies heavily on its ability to market a product it in a package that appeals to its target market. The ability then to understand what customers find attractive and appealing are essential to driving packaging investments, marketing decisions, and ultimately to profit and loss.

While "what sells" generally can be measured in sales, drivers for success cannot be directly attributed to any visual aspect in a truly objective way unless fine-grained characteristics and be identified and associated with success metrics over many different examples. The automatic fine-grained visual elements extraction from beverage packaging images provides information to facilitate for further analysis.

It would be helpful to understand what visual elements in the packaging are leading to more appealing products, but it is nearly impossible to establish this association in any direct way today—even though minor visual differences may very well be helping the consumer decide a brand's success.

While defining success based on what comes off shelves may be somewhat more straightforward through a variety of metrics (i.e., sales numbers, invoice volume, promotional pressure, market demand, etc. . . . ), attributing success and popularity to specific fine-grained visual/physical characteristics is not. For example, just because Beer A has great sales, it does not follow that using the same exact logo typeface will likely lead to success for Beer B.

There may be a variety of reasons why consumers pick one product over another when they are comparing competing products on the shelf. Assuming for argument's sake that all other obvious factors cancel out or are not significant (taste, cost, etc. . . . ), one can hypothesize that the average consumer will likely choose the more visually "appealing" package. One can easily imagine a thought experiment where a person is given a choice of drinking the same drink from two vastly different package aesthetics: package one is a clean and elegant bottle with neatly printed labels, while package two is an old, cracked, and dusty bottle with a handwritten masking tape label carelessly placed over the front. While this illustration makes the choice easy, reality presents a much harder scenario where competing products are all carefully designed and attractive. Hence, the real-world scenario requires robust techniques that can more accurately dissect a package/bottle's attributes in finer detail to better analyze the differences between two competing products as they pertain to success (sales, demand, etc. . . . ).

Changes in packaging require significant investment with no clear projection of return or success. It would be helpful to know which elements are truly worth investing in.

In one example, a brand manager may be planning the packaging strategy for the upcoming holiday. Every visual element and feature are meticulously planned—each incurring a corresponding resource cost. These plans are put together loosely based on historical analysis of similar campaigns and surveys. However, these do not consider the probability of success and projected monetary effect for every detailed feature. Having a database of the potential impact and success of each physical change allows the product manager to prioritize features to the most impactful changes and optimize the investment on design/packaging to the ones that will bring the most rerun on the investment.

For both illustrations above, the starting point is first being able to accurately dissect a product's visual appearance into its fine-grained physical attributes for a robust set of data points to base packaging analysis and decisions on. Such information is produced in an automated way by the combination of models described herein, eliminating unconscious bias and tedious notation through manual observation. The output can then be used by the data scientist to tie/associate any data/success metrics for further analysis.

Figure 16:
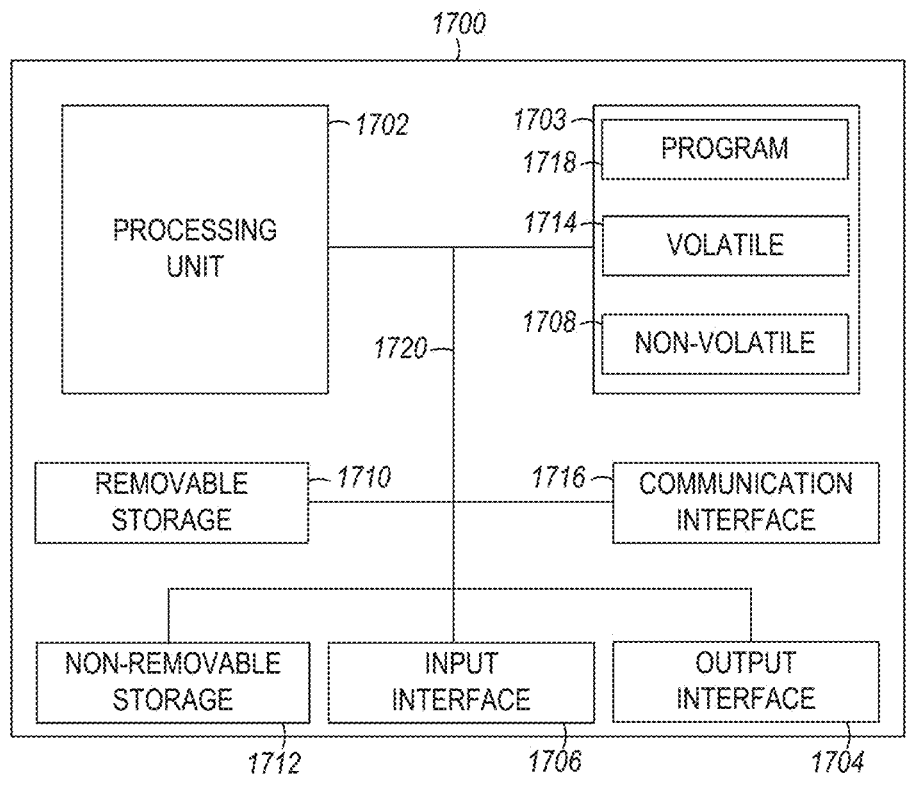
FIG. 16 is a block schematic diagram of a computer system to implement one or more example embodiments.

FIG. 16 is a block schematic diagram of a computer system 1600 to execute models to determine fine-grained features of selected objects in images and for performing methods and algorithms according to example embodiments. All components need not be used in various embodiments.

One example computing device in the form of a computer 1600 may include a processing unit 1602, memory 1603, removable storage 1610, and non-removable storage 1612. Although the example computing device is illustrated and described as computer 1600, the computing device may be in different forms in different embodiments. For example, the computing device may instead be a smartphone, a tablet, smartwatch, smart storage device (SSD), or other computing device including the same or similar elements as illustrated and described with regard to FIG. 16. Devices, such as smartphones, tablets, and smartwatches, are generally collectively referred to as mobile devices or user equipment.

Although the various data storage elements are illustrated as part of the computer 1600, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 1603 may include volatile memory 1614 and non-volatile memory 1608. Computer 1600 may include—or have access to a computing environment that includes—a variety of computer-readable media, such as volatile memory 1614 and non-volatile memory 1608, removable storage 1610 and non-removable storage 1612. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1600 may include or have access to a computing environment that includes input interface 1606, output interface 1604, and a communication interface 1616. Output interface 1604 may include a display device, such as a touchscreen, that also may serve as an input device. The input interface 1606 may include one or more of a touchscreen, touchpad, mouse, keyboard, camera, one or more device-specific buttons, one or more sensors integrated within or coupled via wired or wireless data connections to the computer 1600, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 1600 are connected with a system bus 1620.

Computer-readable instructions stored on a computer-readable medium are executable by the processing unit 1602 of the computer 1600, such as a program 1618. The program 1618 in some embodiments comprises software to implement one or more methods described herein. A hard drive. CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 1618 along with the workspace manager 1622 may be used to cause processing unit 1602 to perform one or more methods or algorithms described herein.

EXAMPLES

1. A computer implemented method includes receiving an image that includes a type of object, segmenting the object into multiple segments via a trained segmentation machine learning model, and inputting the segments into multiple different attribute extraction models to extract different types of attributes from each of the multiple segments.

2. The method of example 1 wherein the trained segmentation machine learning model has been trained on multiple images of the type of object that are labeled with multiple tagged segments identified by bounding boxes.

3. The method of example 3 wherein the trained segmentation machine learning model includes a mask-recurrent convolutional neural network having classes corresponding to the multiple segments of the object.

4. The method of any of examples 1-3 wherein the type of object includes a bottle and wherein the tags comprise classes including bottle, neck, shoulder, body, top, and logo.

5. The method of example 4 wherein the top class includes multiple different top classes and wherein the logo class includes multiple different logo classes.

6. The method of any of examples 1-5 wherein the attribute extraction models include a shape attribute extraction model and a color attribute extraction model.

7. The method of example 6 wherein the color attribute extraction model generates image embedding on each salient region of the image and determines distance differences between the image embeddings and target color text embeddings in the same embedding space, to output target colors.

8. The method of example 7 wherein the color attribute extraction model is an unsupervised model and wherein a distance difference is compared to a threshold to determine that a color is present in a salient region corresponding to one of the segments.

9. The method of any of examples 7-8 wherein the color attribute extraction model generates a list of colors in descending order of area covered by each color in a salient region.

10. The method of any of examples 6-9 wherein the shape attribute model utilizes ratios of measurements of bounding boxes corresponding to segments to generate shape descriptions.

11. The method of any of examples 6-10 wherein the attribute extraction models include a design elements attribute extraction model.

12. The method of example 11 wherein the design elements attribute extraction model is an unsupervised model that compares image embeddings to design element text embeddings in the same embedding space to select design element themes.

13. The method of example 12 wherein the type of object includes a bottle and wherein the design elements capture a main design theme of the bottle's shape as function of a highest score for each design theme.

14. A machine-readable storage device having instructions for execution by a processor of a machine to cause the processor to perform operations to perform any of the methods of examples 1-13.

15. A device includes a processor and a memory device coupled to the processor and having a program stored thereon for execution by the processor to perform operations to perform any of the methods of examples 1-13.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
   receiving an image that includes a type of object;
   segmenting the image of the object into multiple segments, including multiple body part shape segments, via a trained segmentation machine learning model; and
   inputting the segments into multiple different attribute extraction models to extract different types of attributes from each of the multiple segments.

2. The method of claim 1 wherein the trained segmentation machine learning model has been trained on multiple images of the type of object that are labeled with multiple tagged segments identified by bounding boxes.

3. The method of claim 2 wherein the type of object comprises a bottle and wherein tags comprise classes including bottle, neck, shoulder, body, top, and logo.

4. The method of claim 3 wherein the top class includes multiple different top classes and wherein the logo class includes multiple different logo classes.

5. The method of claim 1 wherein the trained segmentation machine learning model comprises a mask-recurrent convolutional neural network having classes corresponding to the multiple segments of the object.

6. The method of claim 1 wherein the attribute extraction models include a shape attribute extraction model and a color attribute extraction model.

7. The method of claim 6 wherein the color attribute extraction model generates image embedding on each salient region of the image and determines distance differences between the image embeddings and target color text embeddings in the same embedding space, to output target colors.

8. The method of claim 7 wherein the color attribute extraction model is an unsupervised model and wherein a distance difference is compared to a threshold to determine that a color is present in a salient region corresponding to one of the segments.

9. The method of claim 7 wherein the color attribute extraction model generates a list of colors in descending order of area covered by each color in a salient region.

10. The method of claim 6 wherein the shape attribute model utilizes ratios of measurements of bounding boxes corresponding to segments to generate shape descriptions.

11. The method of claim 6 wherein the attribute extraction models include a design elements attribute extraction model.

12. The method of claim 11 wherein the design elements attribute extraction model is an unsupervised model that compares image embeddings to design element text embeddings in the same embedding space to select design element themes.

13. The method of claim 12 wherein the type of object comprises a bottle and wherein the design elements capture a main design theme of a shape of the bottle as function of a highest score for each design theme.

14. A machine-readable storage device having instructions for execution by a processor of a machine to cause the processor to perform operations to perform a method, the operations comprising:

receiving an image that includes a type of object;

segmenting the image of the object into multiple segments, including multiple body part shape segments, via a trained segmentation machine learning model; and inputting the segments into multiple different attribute extraction models to extract different types of attributes from each of the multiple segments.

15. The device of claim 14 wherein the trained segmentation machine learning model has been trained on multiple images of the type of object that are labeled with multiple tagged segments identified by bounding boxes.

16. The device of claim 15 wherein the trained segmentation machine learning model comprises a mask-recurrent convolutional neural network having classes corresponding to the multiple segments of the object.

17. The device of claim 15 wherein the type of object comprises a bottle and wherein tags comprise classes including bottle, neck, shoulder, body, top, and logo, wherein the top class includes multiple different top classes and wherein the logo class includes multiple different logo classes, and wherein the attribute extraction models include a shape attribute extraction model and a color attribute extraction model.

18. The device of claim 14 wherein the attribute extraction models include a shape attribute extraction model and a color attribute extraction model, wherein the color attribute extraction model generates image embedding on each segment of the image and determines distance differences between the image embeddings and target color text embeddings in the same embedding space, to output target colors.

19. The device of claim 18 wherein the color attribute extraction model is an unsupervised model and wherein a distance difference is compared to a threshold to determine that a color is present in a salient region corresponding to one of the segments and wherein the shape attribute model utilizes ratios of measurements of bonding boxes corresponding to segments to generate shape descriptions.

20. A device comprising:

a processor; and a memory device coupled to the processor and having a program stored thereon for execution by the processor to perform operations comprising:

receiving an image that includes a type of object;

segmenting the image of the object into multiple segments, including multiple body part shape segments, via a trained segmentation machine learning model; and inputting the segments into multiple different attribute extraction models to extract different types of attributes from each of the multiple segments.

* * * * *